United States Patent [19]
Bushman et al.

[11] Patent Number: 5,511,468
[45] Date of Patent: Apr. 30, 1996

[54] FRUIT JUICE EXTRACTING MACHINE

[75] Inventors: Ronald C. Bushman, Brea; William E. Harris, Jr., Fontana, both of Calif.; Roger N. Foch, Lake Alfred, Fla.

[73] Assignee: Automatic Machinary and Electronics, Inc., Covina, Calif.

[21] Appl. No.: 464,540

[22] Filed: Jun. 5, 1995

Related U.S. Application Data

[62] Division of Ser. No. 419,190, Apr. 10, 1995.

[51] Int. Cl.⁶ .................................................. A23N 1/00
[52] U.S. Cl. .......................... 99/504; 99/501; 99/507
[58] Field of Search ..................... 99/495, 496, 501–509, 99/510; 100/98 R, 116, 127, 218

[56] References Cited

U.S. PATENT DOCUMENTS

| | | | |
|---|---|---|---|
| 1,764,158 | 6/1930 | Edwards | 99/504 |
| 2,575,584 | 11/1951 | Cohen | 99/504 |
| 2,630,849 | 3/1953 | Williams | 99/504 |
| 2,631,625 | 3/1953 | Wells | 99/504 |
| 2,644,568 | 7/1953 | Wells | 198/443 |
| 3,342,314 | 9/1967 | Holbrook | 198/801 |
| 3,796,297 | 3/1974 | Holbrook | 99/504 |
| 3,887,062 | 6/1975 | Bushman | 198/443 |
| 4,421,021 | 12/1983 | Holbrook | 99/504 |
| 4,479,424 | 10/1984 | Carroll | 99/502 |
| 4,759,938 | 7/1988 | Rohm | 99/501 |

*Primary Examiner*—Timothy F. Simone
*Attorney, Agent, or Firm*—Lyon & Lyon

[57] ABSTRACT

A fruit juice extracting machine has a pair of opposing endless cup chains extending around a rotatable reamer wheel. The peel guide or retainer holds reamed peel halves in cup until ejector directs peel half into peel chute. A filler plate panel substantially closes off the reamer wheel to help to prevent the accumulation of stagnant juice or pulp. A peel chute behind the reamer wheel has a back surface with slotted opening to recover additional juice and pulp as the peels are ejected from the cup chain and collide against the back surface of the peel chute. The new cup track is a stiffer structure for maintaining the cup chain in proper engagement to the reamers, for improved yield and reduced wear. A full width bulkhead divides the juicing area from the peel chute area.

7 Claims, 5 Drawing Sheets

5,511,468

FRUIT JUICE EXTRACTING MACHINE

This is a continuation copending application Ser. No. 08/419,190 filed on Apr. 10, 1995.

BACKGROUND OF THE INVENTION

The field of the present invention is fruit juice extracting machines.

Presently, there is much emphasis worldwide on fresh single strength citrus juice, as opposed to juices made from concentrate. Fresh juices are typically not pasteurized and do not include preservatives. Consequently, sanitation in processing citrus juices is very important. To obtain adequate shelf life with fresh juices, bacteria in the juice must be kept at a low level. However, juice extracting machines are often run for e.g., 24 hours or more before they are stopped and cleaned. This allows stagnant juice and pulp to accumulate, leading to increased bacteria in the juice. Juice and pulp can accumulate and stagnate on or in various internal components and spaces, and especially on horizontal areas, leading to excessive bacteria growth. Accordingly, processing fruit into fresh juice has required frequent stopping and cleaning the machines, e.g., every 8 hours, a time consuming and relatively costly but necessary procedure. Cleaning these machines has also required removal of covers or other parts and effort intensive hand cleaning.

A well known fruit juice extracting machine (Brown International Model 700) is shown and described in Wells, U.S. Pat. No. 2,631,625, incorporated herein by reference. This fruit juice extracting machine includes a vertically mounted rotary fruit feeder and hopper arranged to supply citrus fruit to holding cups on a pair of opposing endless cup chains. The feeder delivers fruit to the cups in the cup chain which move towards each other and carry the fruit through a halving knife. The sliced fruit halves are held into the cups by retainers or baffles as the fruit halves are moved to a reamer wheel at the front of the machine. The vertically mounted reamer wheel has a plurality of radially spaced apart spinning reamers. As the cups holding fruit halves approach the reamer wheel, they are guided towards each other by cup tracks and engage the spinning reamers, thereby extracting juice and pulp from the fruit halves. The juice and pulp fall towards to the bottom of the machine and collected and removed from the machine.

The peel remains in the cups until the cups move away from the reamer wheel to a peel chute where a peel ejector ejects the peel from the cups into the peel chute. The peel ejected into the peel chute are collected separately from the juice and pulp, to avoid degrading juice quality with bitter peel oils. After peel ejection, the cups continue to the fruit feeder near the back of the machine to recommence the loading, slicing, reaming and ejection cycle. Although highly successful, this machine can be difficult to clean, and it tends to allow some build up of stagnant juice or pulp. In addition, although highly efficient it has been found that some juice and pulp, released from the peels after entering the peel chute, is not recovered.

This well known fruit juice extracting machine in various embodiments and with various improvements is also shown and described in U.S. Pat. Nos. 2,631,625; 2,644,568; 3,342,314; 3,887,062; 4,421,021 and 4,759,938, also incorporated herein by reference.

SUMMARY OF THE INVENTION

The present invention is directed to an improved fruit juice extracting machine, (Model 720) which can run for longer periods of time with significantly reduced amounts of stagnant juice or pulp buildup, and which may be easily cleaned, preferably with a built in spray cleaning system. The present invention is also directed to such a machine having an improved yield. To these ends, the well known fruit juice extracting machine (Model 700) is provided with a pair of cup tracks positioned on opposite sides of the reamer wheel. The cup tracks include a backing guide supporting its respective cup chain. A filler plate substantially covering over the sides of the reamer wheel is attached to a ramp surface joined to the cup tracks. The configuration of the cup tracks, having primarily vertical surfaces, inhibits pulp buildup. In addition, the cup track and ramp surface form a stiffer support structure for the cup chains for improved reaming yield with lower wear on the components of the machine. The peel chute includes spaced apart parallel bars at the back surface, to allow any juice and pulp carried with the peels, within the peel chute, to pass out of the peel chute for collection. A bulkhead preferably extends substantially entirely across the width of the machine to separate a juicing area from a peel discharge area.

Accordingly, it is an object of the present invention to provide an improved fruit juice extracting machine. Other and further objects and advantages will appear hereinafter.

BRIEF DESCRIPTION OF THE DRAWINGS

In the drawings, wherein similar reference characters denotes similar elements throughout the several views.

DETAILED DESCRIPTION OF THE PREFERRED EMBODIMENT

Figure 1:
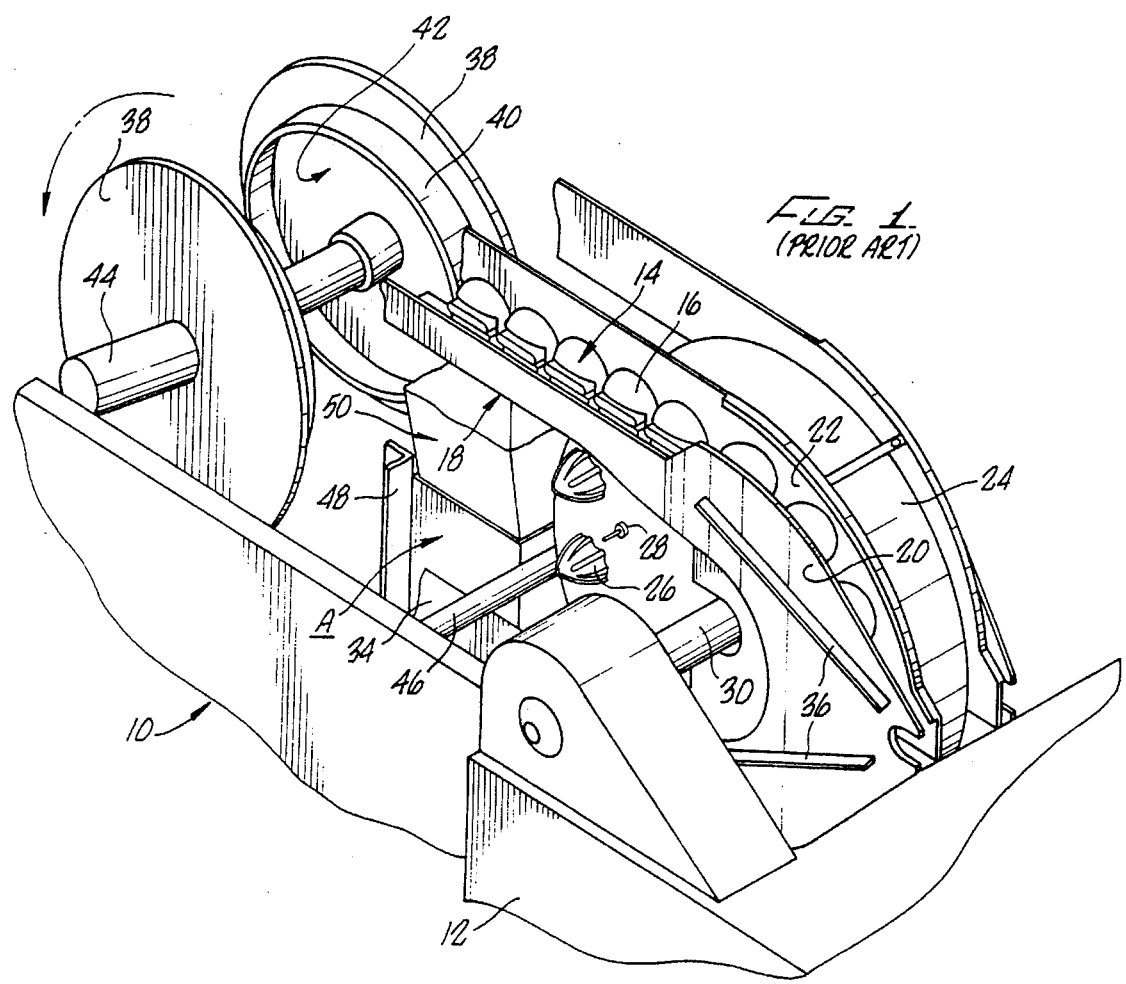
FIG. 1 is a perspective view of the well known (Model 700) fruit juice extracting machine as described above.

Turning to FIG. 1, the well known (Model 700) fruit juice extracting machine 10 includes a frame 12 for supporting various components. For clarity of illustration and description, the covers on the juice extractor 10, which are ordinarily in place and closed during use are not shown. Similarly, the fruit feeder and hopper towards the rear juice extractor 10, the exit chutes, motors, and various other known components, are similarly not shown. The principal operating features of the juice extractor 10 are substantially symmetrical from side to side, except for minor variations insignificant to the description of the present invention. Accordingly, the following description of the components and operation primarily of the left side of the machines as shown in FIGS. 1, 3, 4 and 5 apply to the right side of the machines as well, the right side components being substantially mirror images of the left side components shown in the figures.

Referring still to FIG. 1, a cup chain 14 is made up of a series of cups 16 pivotally linked together. The cups ride in a cup track 18 in the direction of the arrow in FIG. 1. The cup track 18 is formed in part by a backing plate 20 having welded gussets 36. The lower section of the cup track 18 forms a shelf 34 adjacent the reamer wheel 24. A peel retainer 22 is positioned between the backing plate 20 of the cup track 18 and a reamer wheel 24. The open front faces of the cups 16 slide along the peel retainer 22 which retains fruit halves in the cups 16 while the cups move away from the reamer wheel 24.

The reamer wheel 24 is supported on a reamer wheel axle 30 which is turned via chains and sprockets by an electric motor. Reamers 26 are radially spaced apart from each other on both vertical flat sides of the reamer wheel 24. An internal gearing system, separate from the reamer wheel axle 30, rotates the reamers 26 at an appropriate speed and direction. Drive pegs 28 on both sides of the reamer wheel 24 engage drive holes in the cup chain 14 to maintain alignment of the cups 16 and reamers 26, and to pull the cup chain 14 through the juice extractor 10. The cup tracks 18 are moved together or apart by a screw mechanism and pneumatic cylinder, to adjust the depth of engagement of the reamers 26 into the cups 16, as well as the force of engagement.

Figure 2:
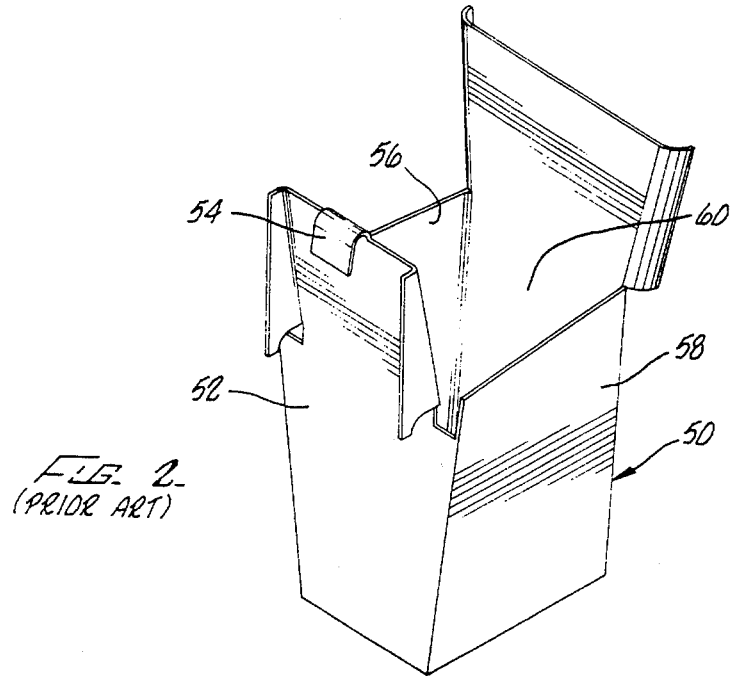
FIG. 2 is a perspective view of the peel chute used in the machine shown in FIG. 1.

A peel chute 50 is positioned in between the cup chains, behind the reamer wheel 24, adjacent structural members 46 and 48. As shown in FIG. 2, the peel chute 50 is fabricated from sheet metal and has a generally flat front surface 52, a hook 54 and flat sheet metal sides 56 and 58, and back surface 60. The hook 54 is used to hang the peel chute 50 in position in the juice extractor 10. Daring cleaning, the covers on the juice extractor 10 are opened and the peel chute 50 is lifted out from the top of the juice extractor 10 for cleaning.

Behind the peel chute 50 are idlers 38 rotating on an idler axle 44. The idlers 38 support and guide the cup chains 14 as they move toward and away from the fruit loading and slicing stations (not shown) at the back of the juice extractor 10. Each idler 38 has a rim 40 forming a space 42. The area generally designated A in FIG. 1 is open. Juice and pulp extracted during reaming can accumulate on the shelf 34, structural member 46, and on other surfaces, including in the space 42 in the idlers 38. The foregoing juice extractor 10 design is well known in the art.

Figure 3:
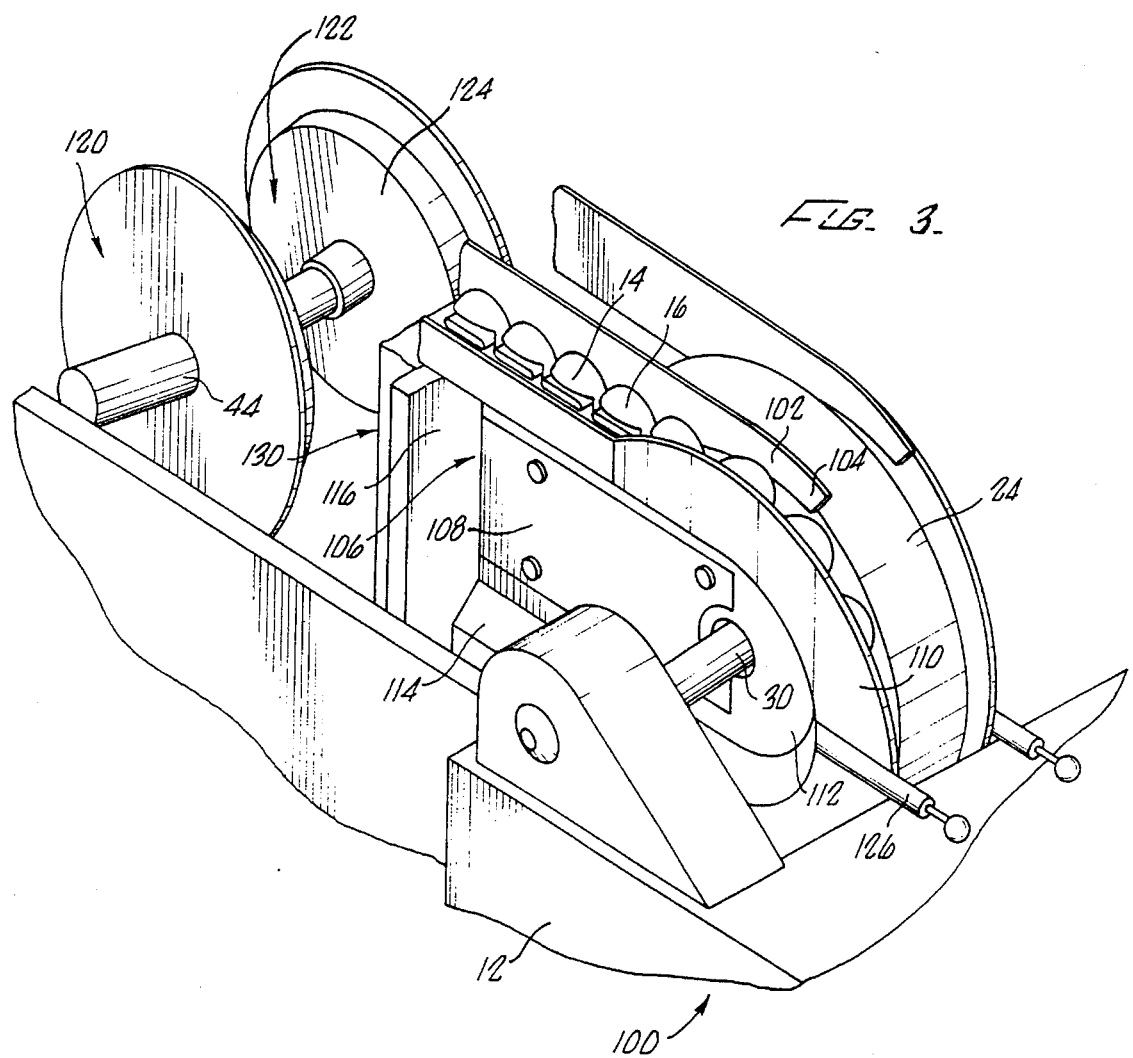
FIG. 3 is a perspective view fragment of the present fruit juice extracting machine.
Figure 4:
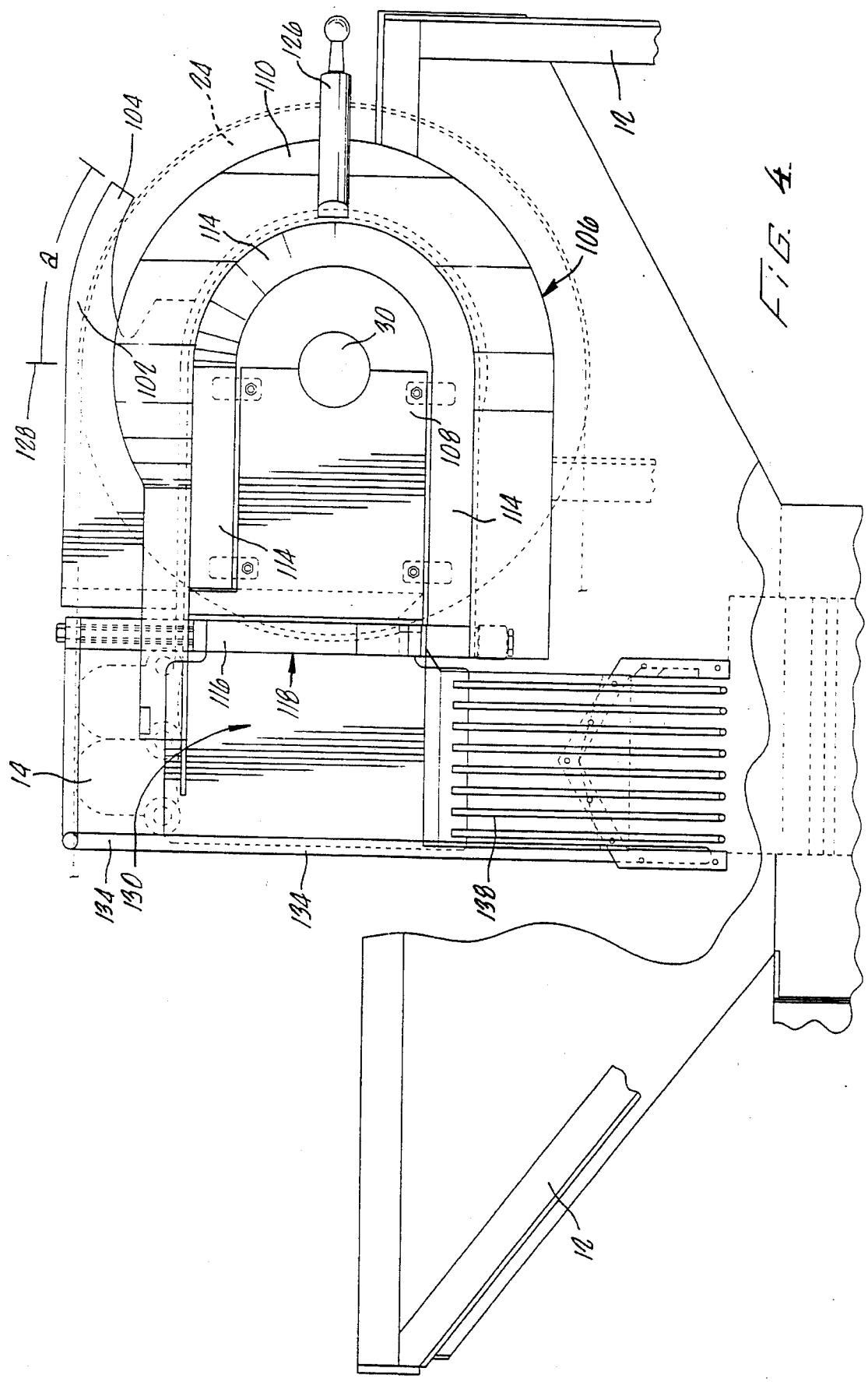
FIG. 4 is a side elevation view fragment thereof.

Turning now to FIG. 3, as shown therein, the present juice extractor 100, has a cup track 106, somewhat similar to the cup track 18 shown in FIG. 1. A backing guide 110 on the cup track 106 is joined to a side plate 112 through a generally continuous ramp surface, 114. A cup track filler plate 108 attached flush with the side plate 112 helps to keep juice near the reamer wheel. The cup chain 14 passes in between the backing guide 110 and a peel retainer 102. Compared to the peel retainer 22 shown in FIG. 1, the peel retainer 102, as shown in FIGS. 3 and 4, is truncated. The front end 104 of the peel retainer 102 extends forward of the center line of rotation 128 of the reamer wheel 24 only a relatively short distance or angle "a" e.g., covering a sector of about 35°, around the reamer wheel 24. In contrast, the peel retainer 22 extends in a sector of approximately 90° around the reamer wheel 24. Peel retainer 102 allows the machine 100 to be more easily cleaned.

Idlers 120 include a cover plate 124 forming a flat substantially vertical surface 122, thereby eliminating the space 42 shown in FIG. 1.

Armatures 126, on each cup track 106 extend forward and are engaged by a pneumatic cylinder to control reamer engagement force, as is well known in the art.

Figure 5:
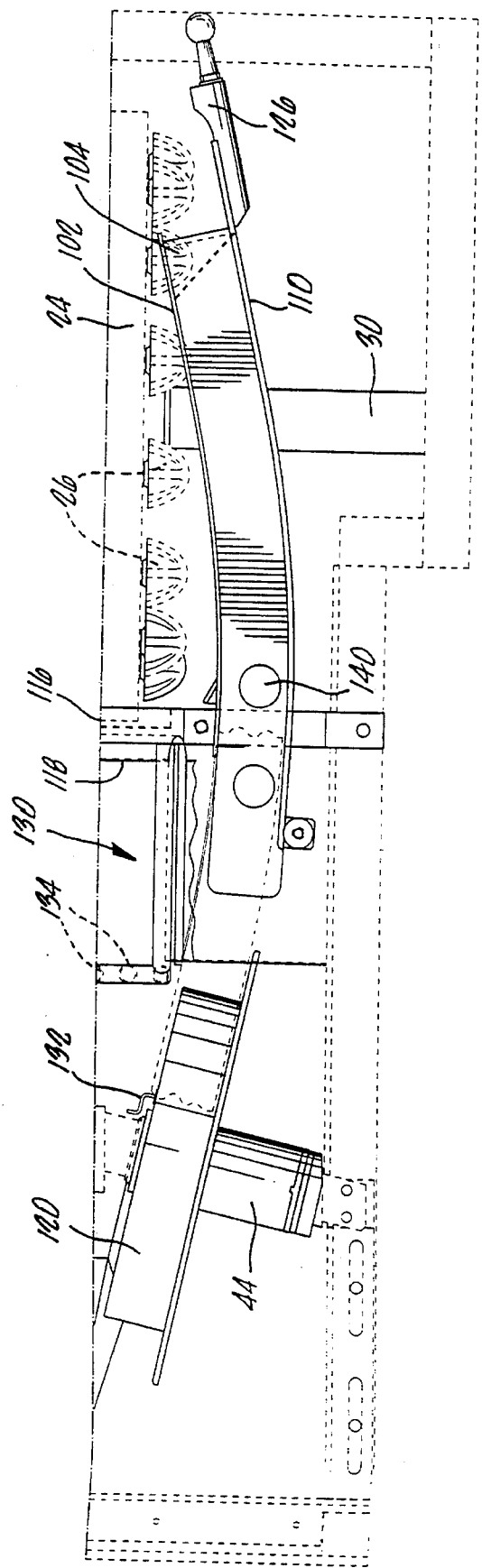
FIG. 5 is a plan view fragment thereof.
Figure 6:
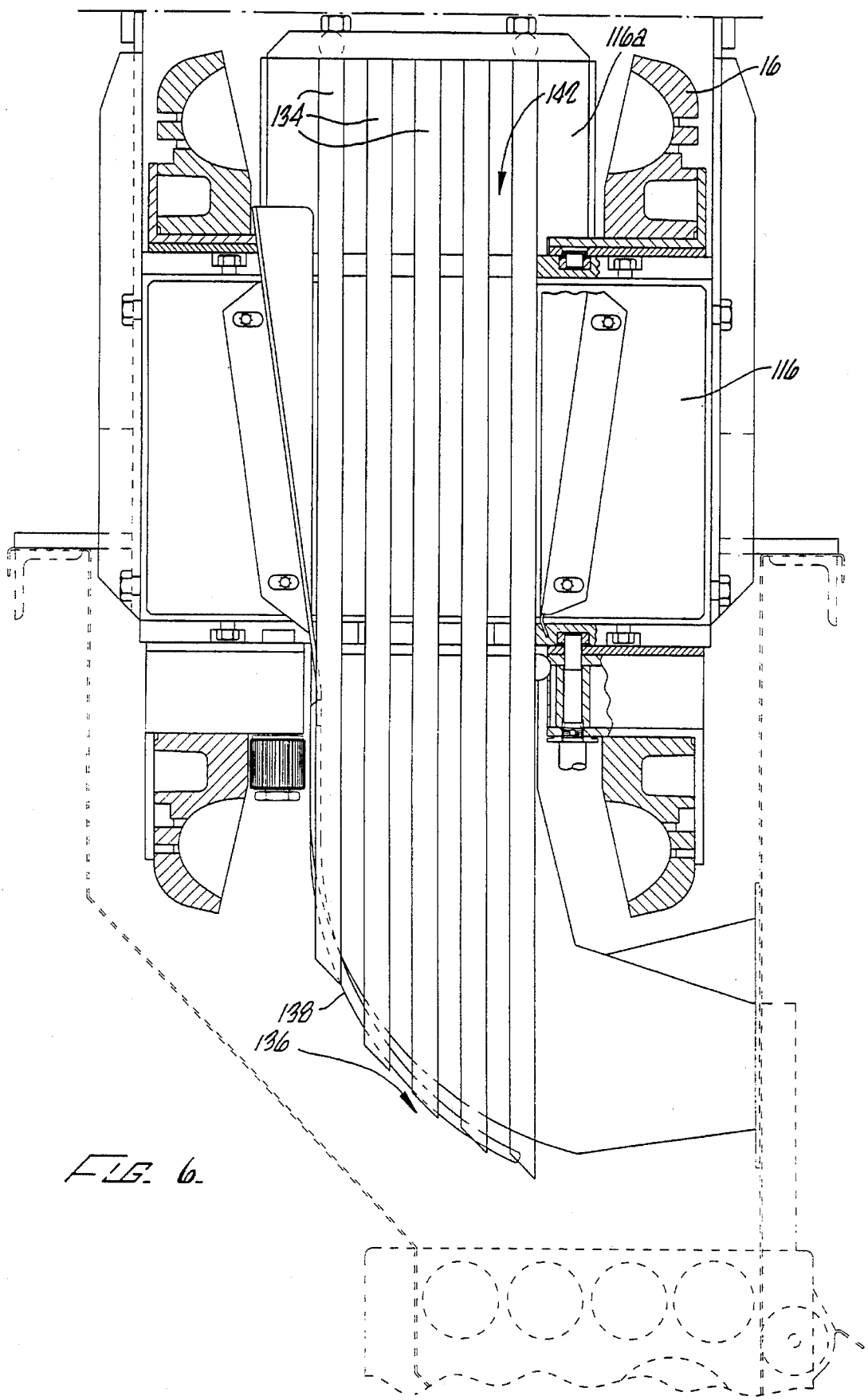
FIG. 6 is a rear view fragment in pan section thereof.

Referring to FIGS. 5 and 6, a bulkhead 116 extends between top and bottom of cup tracks 106 and across substantially the entire width of the juice extractor 100. The bulkhead is preferably a fabricated metal assembly made thick enough to include hardware or fittings which provide for the pivotable attachment of the cup tracks to the bulkhead. A plastic upper bulkhead 116a may also be provided. The back surface 118 of the bulkhead 116 acts as the forward surface of the peel chute 130. The left and right sides of the peel chute 130 are also solid panels of sheet metal. However, the rear wall of the peel chute 130 is formed of spaced apart bars 134, as shown in FIG. 6. As peels are ejected from the cups and collide with the bars 134, small but significant mounts of juice and pulp are, ejected from the peels and passed through the spaces or gaps 142 between the bars 134, and pass into the juice/pulp collection trough 136. As shown in FIGS. 4 and 6, fingers 138 at the bottom of the peel chute 130 direct the peels to the left side (when viewing the machine from the from) and out of the machine for collection.

As shown in FIG. 5, a prong 132 on the idler 120 continuously scrapes pulp off of the idler axle. Drain holes 140 are provided in the top cup track.

In operation, as the juice extractor 100 reams the fruit halves, pulp and juice fly about within the machine 100 and eventually fall or drip down to the collection trough 136. As shown in FIG. 3, the cup track filler plate 108 substantially closes off the reamer wheel 24, and has primarily vertical surfaces to prevent accumulation of pulp. In addition, the cup track 106 also has relatively smooth contours with a minimum of recessed or hidden areas, so that there is little opportunity for stagnant juice or pulp to accumulate, and so that it may be readily cleaned. During operation, pulp may temporarily accumulate at various locations, and then fall off for collection in the trough 136, due to the increasing weight of the pulp accumulation or other factors. Such temporary accumulations do not significantly effect juice quality as they do not remain long enough for significant bacteria growth. On the other hand "permanent" accumulations remain in place until the machine is cleaned. The design of the cup track 106 reduces "permanent" accumulations of pulp.

The cup track 106 also provides a stiffer structure than the known cup track 18 shown in FIG. 1, which is believed to provide a better yield by reducing undesired displacement of the cups 16 as they engage the reamers 26. The stiffer structure of the of the cup track 106 also allows the extractor 100 to operate with less force urging the armatures 126 together (i.e., specifically, less air pressure in the pneumatic cylinder.) For example, with the prior art extractor 10, the pneumatic actuator is typically supplied with compressed air at 130 psi, to urge the cup tracks 20 together, and hold the reamer cups into the reamers. On the other hand, the present juice extractor 100, as shown in FIG. 3, can operate with only 100 psi supplied to the pneumatic cylinder to urge the armatures 126 together, while providing an equivalent yield. Operation with lower air pressure reduces wear on various components of the machine 100, such as the reamers 26, cups and cup chain 16 and their related drive train and support components. Accordingly, the machine 100 experiences less down time and longer useful operating life. In addition, the lower pressure also reduces the mount of bitter peel oils released with the juice and pulp during reaming. The cup track 106 with the filler plate 108 also tends to guide juice and pulp more directly to the collection trough 136.

Turning to FIGS. 4, 5 and 6, the open spaces 142 in between the peel chute bars 134 at the rear of the peel chute 130 improve yield by allowing juice and pulp to escape from the peel chute 130. In addition, the side walls of the peel chute 130 are positioned to allow any juice on the cups to drip into juice collection areas, and not down the peel chute 130. As a peel is ejected from the cups, it is thrown toward the back wall of the peel chute 130, i.e., against the peel chute bars 134. Any hanging pulp, rag and free juice passes through the peel chute bars 134 upon impact of the peel half, and is directed into the juice trough 136 for recovery. The peels exiting the machine 100 are accordingly significantly drier than with the prior art machine.

Referring to FIGS. 1 and 2, in the extractor 10, the broad flat surface 52 of the removable peel chute 50 rests against a supporting member, creating "trapped areas" where pulp can accumulate. This trapped pulp is removed only when the machine 10 is stopped and opened up for cleaning, with the peel chute 50 being temporarily removed from the machine 10. The present extractor 100, on the other hand, is cleaned without removal of any components, and has few, if any, trapped areas. This allows for faster and easier cleaning.

Referring to FIG. 4, the short peel retainer will tend to gently guide a peel half that may be misaligned. In the juice extractor 10 shown in FIG. 1, the peel retainer 22 extends entirely down to the armature area. Peels of misaligned fruit halves can disadvantageously be abraded or compressed against the peel retainer, releasing peel oils. The peel retainer 102 facilitates cleanup by substantially removing the wedge angle space (which tends to accumulate large amounts of pulp) between the backing guide 110 and peel retainer 22 in the prior art machine 10 shown in FIG. 1.

The juice extractor 10 may be upgraded to the present improved juice extractor 100 with a retrofit kit including the left and right side cup tracks 106; cup track filler plates 108; peel retainers 102; idlers 120; the bulkhead 116; rear peel chute 134 and peel chute side panels.

Thus, a fruit juice extraction machine is disclosed which provides improved performance. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed:

1. In a fruit juice extracting machine of the type having a pair of opposing endless cup chains extending around a reamer wheel rotatable about a horizontal axis and having a plurality of spaced apart reamers for reaming fruit halves contained in cups on the cup chains, with a peel chute positioned in between the cup chains and behind the reamer wheel, for collecting and channeling fruit peels ejected from the cups, the improvement comprising:

the peel chute having a rear surface including a plurality of openings, to allow at least some juice ejected from the peel after it enters the peel chute, to pass out of the peel chute for collection.

2. The fruit juice extracting machine of claim 1 further comprising a plurality of spaced apart bars, with the spaces between the bars forming the plurality of openings.

3. The fruit juice extracting machine of claim 1 wherein the peel chute has side walls positioned to allow any juice on the cups to drip into a juice collection area, and not into the peel chute.

4. The fruit juice extracting machine of claim 1 further comprising a bulkhead panel separating the peel chute from the reamer wheel.

5. The fruit juice extracting machine of claim 1 further comprising a pair of cup tracks positioned adjacent to and on either side of the reamer wheel, each cup track having a backing guide, a ramp surface adjoining the backing guide, and a filler plate within the ramp surface, with the filler plate substantially closing off one side of the reamer wheel.

6. The fruit juice extracting machine of claim 1 further comprising a truncated peel retainer adjacent the reamer wheel and extending for an arc of less than about 45° into a fruit half engagement sector of approximately 90° formed by the cup chains and reamer wheel.

7. In a fruit juice extracting machine having an endless cup chain extending around a reamer wheel rotatable about a horizontal axis and having a plurality of spaced apart reamers for reaming fruit halves contained in cups on the cup chains, the improvement comprising:

a peel chute positioned adjacent the reamer wheel, with the peel chute having a back surface opposite from the reamer wheel including openings.

\* \* \* \* \*